United States Patent
Rigazio et al.

(10) Patent No.: US 6,915,259 B2
(45) Date of Patent: Jul. 5, 2005

(54) SPEAKER AND ENVIRONMENT ADAPTATION BASED ON LINEAR SEPARATION OF VARIABILITY SOURCES

(75) Inventors: Luca Rigazio, Santa Barbara, CA (US); Patrick Nguyen, Santa Barbara, CA (US); David Kryze, Ponchartrain (FR); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 778 days.

(21) Appl. No.: 09/864,838

(22) Filed: May 24, 2001

(65) Prior Publication Data

US 2003/0050780 A1 Mar. 13, 2003

(51) Int. Cl.[7] .............................................. G10L 15/06
(52) U.S. Cl. ....................................... 704/244; 704/234
(58) Field of Search ................................. 704/224, 226, 704/234, 243, 244, 245

(56) References Cited

U.S. PATENT DOCUMENTS

| | | |
|---|---|---|
| 5,131,043 A | 7/1992 | Fujii et al. |
| 5,309,547 A | 5/1994 | Niyada et al. |
| 5,345,536 A | 9/1994 | Hoshimi et al. |
| 5,664,059 A | 9/1997 | Zhao |
| 5,684,925 A | 11/1997 | Morin et al. |
| 5,692,097 A | 11/1997 | Yamada et al. |
| 5,822,728 A | 10/1998 | Applebaum et al. |
| 6,026,359 A | * 2/2000 | Yamaguchi et al. ........ 704/256 |

FOREIGN PATENT DOCUMENTS

EP 0779609 A3 12/1995
EP 0779609 A2 12/1995

OTHER PUBLICATIONS

Kim, Ns; Statistical Linear Approximation for Environment Compensation, IEEE Signal Processing Letters, vol. 5, No. 1, pp. 8–10, Jan. 1998.*
Cerisara et al.; "Environmental Adaptation Based on First Order Approximation"; Panasonic Speech Technology Laboratory; Santa Barbara, California.
Sagayama et al.; "Jacobian Approach to Fast Acoustic Model Adaptation"; NTT Human Interface Laboratories; IEEE, 1997; pp. 835–838.
Leggetter et al.; "Flexible Speaker Adaptation Using Maximum Likelihood Linear Regression"; Cambridge University Engineering Department; Cambridge, United Kingdom.
S. Sagayama, Y. Yamaguchi, S. Takahashi, J. Takahashi, "Jacobian Approach to Fast Acoustic Model Adaptation", Acoutstics, Speech, and Signal Processing 1997, IEEE International Conference on Munich, Germany.
Luca Rigazio et al., "Separating Speaker and Environment Variabilities for Improved Recognition in Non–Stationary Conditions" Proceedings of Eurospeech 2001, vol. 4, Sep. 2–7, 2001, p. 2347.

* cited by examiner

*Primary Examiner*—Abul K. Azad
(74) *Attorney, Agent, or Firm*—Harness, Dickey & Pierce, PLC

(57) ABSTRACT

Linear approximation of the background noise is applied after feature extraction and prior to speaker adaptation to allow the speaker adaptation system to adapt the speech models to the enrolling user without distortion from background noise. The linear approximation is applied in the feature domain, such as in the cepstral domain. Any adaptation technique that is commutative in the feature domain may be used.

25 Claims, 2 Drawing Sheets

SPEAKER AND ENVIRONMENT ADAPTATION BASED ON LINEAR SEPARATION OF VARIABILITY SOURCES

BACKGROUND AND SUMMARY OF THE INVENTION

The present invention relates generally to speech recognition. More particularly, the invention relates to speaker adaptation in noisy environments.

Speech recognition systems may be classified into two groups: speaker independent and speaker dependent. Typically, the speaker independent system is constructed based on a corpus of training data from a plurality of speakers and the speaker dependent system is constructed using a process called speaker adaptation, whereby the speech models of a speaker independent system are adapted to work better for a particular new speaker. Speaker adaptation often involves the problem of how to estimate reliable models from small amounts of adaptation data from the new speaker. When adapting a speaker independent system to a speaker dependent one, the enrolling user provides an initial quantity of enrollment speech (adaptation speech) from which the adapted models are constructed. Because providing enrollment speech takes time, users prefer systems that will adapt with minimal training or that are capable of adapting on the fly as the system is being used.

There are numerous different speaker adaptation techniques in popular use today. They include maximum likelihood linear regression (MLLR) and maximum a posteriori (MAP) estimation. Generally, adaptation techniques such as these are successful when applied under low noise conditions. However, the techniques begin to fail as the background noise level increases.

We believe that one reason adaptation systems fail is that the speaker adaptation processes ignore information about the environment model. Thus when enrollment speech is provided in the presence of background noise, the adaptation system will attempt to compensate for both the enrolling speaker's speech and the background noise. Because the background noise may vary unpredictably, the resulting adapted models are likely to work very poorly in practice.

The present invention solves this problem by utilizing a special linear approximation of the background noise that is applied after feature extraction and prior to speaker adaptation to allow the speaker adaptation system to adapt the speech models to the enrolling user without distortion from the background noise. Notably, the technique works in the extracted feature domain. That is linear approximation of the background noise is applied in the feature domain (e.g., in the cepstral domain, or other statistical domain) rather than in the time domain associated with the input enrollment utterance. The presently preferred embodiment uses a Jacobian matrix to implement the linear approximation of the background noise. Other linear approximations may be used in the alternative.

For a more complete understanding of the invention, its objects and advantages, refer to the following written description and to the accompanying drawings.

DESCRIPTION OF THE PREFERRED EMBODIMENT

Figure 1:
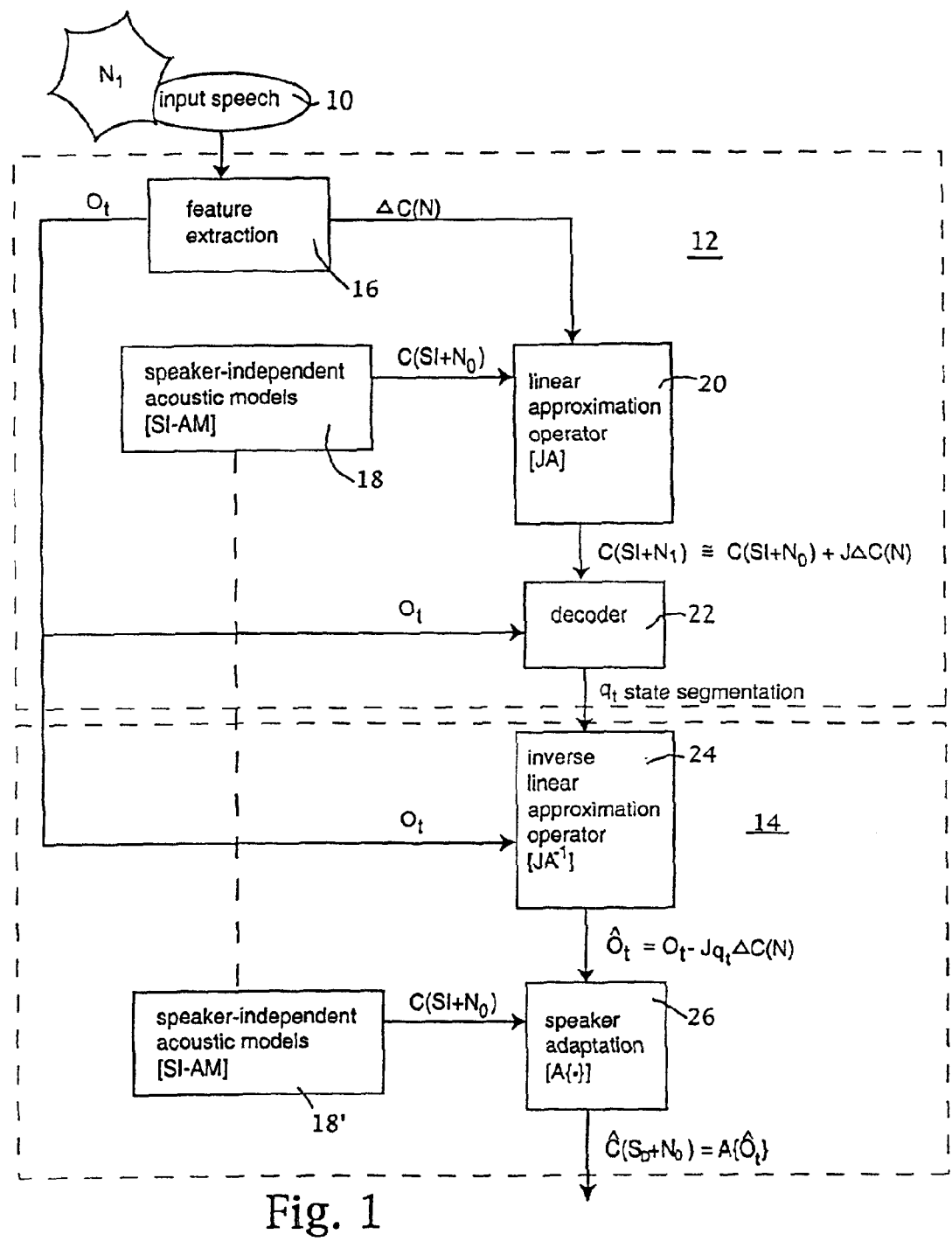
FIG. 1 is a block diagram of a speech recognizer employing an improved speaker adaptation system in accordance with the invention.

FIG. 1 illustrates an embodiment of the invention in a speech recognizer application. The application is designed to perform speaker adaptation upon input speech 10 that is provided in the presence of background noise $N_1$. The application comprises a noise-compensated recognizer, shown generally within the dashed box 12 and a speaker adaptation module shown generally within the dashed box 14. The noise compensated recognizer performs feature extraction upon the input signal (in the presence of noise $N_1$) using the feature extraction component 16. In the presently preferred embodiment cepstral coefficients are extracted by feature extraction component 16 to provide the cepstral domain or feature domain observation data $O_r$. Note that the observation data is processed as a sequence of frames according to a predetermined time window.

The recognizer uses a set of speech models 18 that are initially supplied as speaker-independent models. The models are developed at training time under noise conditions that are likely to be different from those encountered during system use. Thus the speaker independent acoustic models 18 are considered to have been developed in the presence of noise $N_0$. Because the noise compensated recognizer of the illustrated embodiment extracts features to operate in the cepstral domain, the acoustic models 18 are likewise in the cepstral domain and thus may be expressed as $C(SI+N_0)$.

Because the noise compensated recognizer 12 uses acoustic models that were developed under noise condition $N_0$ and that are then used under noise conditions $N_1$, an estimate of the noise level difference must be assessed. This is done by the feature extraction module 16 which extracts features from a pre-speech frame before the input speech utterance begins. Thus the noise level $N_1$ may be established as the noise level present the ambient environment immediately prior to using the system. The feature extraction module computes the difference in noise level $(N_1-N_0)$ and expresses this difference in the cepstral domain. The difference is fed to a linear approximation operator 20 along with the speaker independent acoustic models, as illustrated in FIG. 1. The presently preferred embodiment employs a Jacobian operator to represent the noise difference. In this way, the linear approximation operator computes an estimate of the speaker independent acoustic models under noise condition $N_1$. Note that the estimate is computed by taking the original speaker independent acoustic models and adding the noise difference component as expressed by the Jacobian adaptation matrix.

Having converted the speaker independent acoustic models from the initial noise $N_0$ domain to the subsequent noise $N_1$ domain, the decoder 22 is now able to decode the input speech. Specifically, the feature extraction module 16 supplies the input speech (plus noise) as observation data $O_r$. The observation data is fed to decoder 22, which decodes the observation data using the noise-compensated acoustic models. Decoder 22 thus provides the state segmentation $q_r$. The state segmentation is needed by the speaker adaptation module 14 as will be described below.

Note that the noise compensated recognizer 12 of the illustrated embodiment uses the linear approximation operator (the Jacobian operator) to decode the observation data in the presence of noise $N_1$. While this is a presently preferred form of the invention, other noise compensated recognizers may be used. Specifically, it is not necessary that the Jacobian operator be used to determine the state segmentation. In general, any recognizer capable of decoding the input speech in the presence of noise may be used.

The speaker adaptation module 14 employs an inverse linear approximation operator 24 to remove the effect of the $N_1$ background noise prior to adaptation. The presently preferred embodiment uses a Jacobian operator based on a linear approximation of the background noise. The inverse linear approximation operator 24 operates upon the observation data $O_t$, using the state segmentation information derived from decoder 22. The result of the inverse approximation is a set of modified observation data that has been cleaned up to remove the effects of background noise. Speaker adaptation is then preformed by module 26.

Essentially, any speaker adaptation technique that is commutative with the linear approximation operator may be used. The adaptation module 26 operates upon the speaker independent acoustic models. In FIG. 1 the acoustic models have been reproduced again at 18' to simplify the presentation of the drawing. If desired, the system can be operated iteratively in several respects. The speaker independent acoustic models, once adapted by module 26, can be used at 18 to extract even more accurate state segmentation, which is then used to perform an even more precise inverse linear approximation operation with further improved speaker adaptation. As will be more fully described below, the Jacobian operator (an inverse Jacobian operator) may also be computed in an iterative fashion.

The linear approximation operator employed by modules 20 and 24 are based on a first order approximation with which to compensate for the noise environment, while allowing a global adaptation scheme to be applied for speaker adaptation. Although a first order approximation is presently preferred and gives good results, higher order approximations may alternatively be used. The invention models the environment (noise level) using a linear model which may be applied in the feature domain (e.g., cepstral domain). As will be illustrated below, use of a linear model offers a significant advantage. Being linear, the operator can be applied commuatively with a speaker adaptation operator that is also linear. In this regard, both MLLR and MAP speaker adaptation operators are linear and may thus be applied commuatively vis-à-vis the linear model of the environment.

In general, speaker adaptation must deal with the problem of estimating reliable models often from small amounts of user-supplied speech data. A variety of speaker adaptive algorithms, including MLLR and MAP, are frequently used in this regard. Often, a combination of MAP and MLLR (MAP/MLLR) will be used. In the combined approach MLLR is applied first:

$$\mu MLLR = \left[\arg \max_w p(O \backslash W\mu_o)\right]\mu_o;$$

then a MAP smoothing is applied to relax the constraints imposed by the linear regression:

$$\mu MAP \backslash MLLR = \arg \max_\mu p(O\backslash\mu)p_o(\mu\backslash\mu MLLR).$$

In the previous equations $\mu_o$ is the speaker independent mean, W is the regression matrix, $p(O\backslash\mu)$ is the likelihood and $p_o(\mu\backslash\mu MLLR)$ is the likelihood conjugate prior centered around $\mu$. For the MLLR step we used a single regression class. Throughout the experiments, MLLR adaptation provided results close to MAP|MLLR, but consistently worse. For this reason we report only MAP|MLLR results. Notice both MLLR and MAP|MLLR adaptations are linear operators $\hat{\mu}=A\{O_t,\mu\}$.

Noise compensation.

Let X be a spectral vector, and let C(X)=F log (X) be the cepstral operator, when F is the DCT matrix and log (X) is intended to be component-wise. Noise compensation of model first order statistics can be carried out according to $C(S+N)=C(C^{-1}(C(S))+N)$, where C(S) is the clean speech cepstrum (or equivalently the gaussian means), C(S+N) is the estimate of the speech cepstrum subject to the estimated noise N.

$$C(S+N_1) \approx C(S+N_0)+J(S,N_0)\Delta C(N), \quad (1)$$

$$J(S, N_o) = \frac{\partial C(S+N)}{\partial C(N)}\bigg|_{N=N_o} = F\frac{N_o}{S+N_o}F^T, \quad (2)$$

where $N_0$, $N_1$ are the training and test background noises, $\Delta C(N)=C(N_1)-C(N_0)$, and $$\frac{N_o}{S+N_o}$$

is intended to be a diagonal matrix. Notice that the noise at training time has to be non zero to guarantee the Jacobian matrix $J(S_1N_0)$ to be full rank.

Our target is to estimate speaker adapted models from noisy data. We are concerned only with first order statistics. By taking the expectation of the observations, and by using equation (1) we have:

$$E\{O\} = C(S_D + N_1),$$

$$C(S_D + N_1) \approx C(S_D + N_O) + J(S_D, N_O)\Delta C(N).$$

From the linearity of the expectation operator $E\{\cdot\}$ we have:

$$C(\underline{S}_D+N_0) \approx E\{O-J(S_D,N_0)\Delta C(N)\}. \quad (3)$$

This means we can compute speaker dependent models for the training environment $N_0$ by taking the expectation of the modified observations $O'=O-J(S_D,N_0)\Delta C(N)$. Notice that the result holds for any linear generalized expectation operator, including the adaptation operator $A\{O_t,\mu\}$. Unfortunately equation (3) does not directly solve (in general) since $S_D$, is needed to compute $J(S_D,N_0)$ and vice versa.

$$C(S_D^{t+1}+N_0) \approx E\{O-J(S_D^{t+1},N_0)\Delta C(N)\} \approx E\{O-J(S_d^t,N_0)\}$$

However we can provide an iterative solution to equation (3):

$$\hat{\mu}^{t+1} = E\{O - \hat{J}^t \Delta C(N)\}$$

$$\hat{J}^t = F\frac{N_o}{C^{-1}(\hat{\mu}^t)}F^T$$

The initialization should be based on the best available estimate of $J(S_D,N_0)$. In practice that means the matrix associated to the models obtained from the last adaptation increment, or the speaker independent matrix for the first adaptation increment ($S_D^O=S_I$). The algorithm should converge in few iterations, as long the assumptions on ($S_D^{t+1}$, $N_0$) are respected. Also, if we make the stronger assumption that $J(S_D^t,N_0)$ is constant in t, it follows that $J(S_I,N_0)=J(S_I,N_0)$, that the Jacobian matrices do not have to be recomputed and that equation (3) can be solved directly. This assumption would drastically reduce the computational complexity of the algorithm since recomputing Jacobian matrices is very expensive (it requests exponentiations, divisions and matrix multiplications). In section 5 we will assess the practicality of these assumptions in term of recognition results. Since we are interested in adapting gaussian means of Hidden Markov Models, the expectation operator has to be computed from incomplete data by integrating over the hidden states q via Expectation Maximization. In practice we make the approximation of considering only the best path (Viterbi), and of using for each frame the Jacobian matrix associated to the winning gaussian to compute O'. The alignment is computed using the last acoustic models ($\hat{\mu}^t$) compensated for the test noise with the last Jacobian matrices ($\hat{J}^t$).

To test the proposed method we used a database of previously recorded isolated words. The test database consists of 14 speakers recorded in a car driving at 30 MPH and 60 MPH, each uttering 150 words per session, for a total of about 2 hours of speech. The average signal to noise ratios are about 12 dB for the 30 MPH session and 7 dB for 60 MPH session. Noise, compensation was performed based on the noise estimated during the first 25 frames of the sentence and using modified Jacobian matrixes with a noise overestimation factor $\alpha=2.5$. The compensation was carried out for both static and dynamic coefficients. Cepstral mean adaptation was optionally applied to compensate for channel mismatch. The baseline recognition results for the clean development set (DEV), the 30 MPH and 60 MPH noisy test sets are reported in table 1. Results without noise compensation are very low beca between training and test environment, and results for Jacobian are close to CMA because the channel is mostly stationary (the database is recorded using the same microphone).

|        | NONE | JAC  | CMA  |
|--------|------|------|------|
| DEV    | 6.2  | 6.1  | 5.9  |
| 30 MPH | 87.5 | 12.8 | 12.0 |
| 60 MPH | 95.8 | 18.0 | 17.5 |

Table 1: Baseline word error rates without noise compensation (NONE), with Jacobian (JAC) and with Jacobian plus cepstral mean adaptation (CMA).

With stationary environments we refer to data collected at a fixed car speed: the car noise itself is quite stationary and the amount of noise is also stationary within a recognition session. This setting may facilitate speaker position estimation, especially for the speaker adaptation algorithm, because the perturbations of the noise are stationary and may be averaged out over long periods of time. Table 2 shows recognition results for the proposed method, MAP|MLLR|JAC, and for the MAP|MLLR speaker adaptation. We used unsupervised incremental speaker adaptation, with increment steps of 10 sentences, and a single iteration for the estimation of the speaker adapted Jacobian matrices $\hat{J}^t$ (more iterations did not provide significant improvements). Results show that MAP|MLLR|JAC improves significantly compared with MAP|MLLR in noisy conditions (an average of 55% relative error rate reduction for the 30 MPH and 60 MPH), and degrades only marginally on the clean development set.

|        | MAP\|MLLR | MAP\|MLLR\|JAC |
|--------|-----------|----------------|
| DEV    | 4.8       | 5.1            |
| 30 MPH | 22.6      | 9.4            |
| 60 MPH | 29.2      | 13.9           |

Table 2: Word error rates for speaker adaptation and for joint speaker adaptation and noise compensation in stationary environments.

Table 3 shows results obtained with the MAP|MLLR|JAC algorithm based on the stronger assumption that Jacobian matrices are unaffected by the speaker adaptation. Although we can notice a performance degradation, the algorithm can still deliver a large improvement over MAP|MLLR and JAC or CMA. This discovery may seem counter intuitive, however it is very important for reducing the complexity of the algorithm. Further investigations are needed to understand why this approximation holds so well in real conditions.

|        | $\hat{J}^t = J(S_1 N_0)$ |
|--------|--------------------------|
| DEV    | 4.9                      |
| 30 MPH | 9.8                      |
| 60 MPH | 14.5                     |

Table 3: Word error rates for joint speaker adaptation and noise compensation for stationary environments, without the update of the Jacobian matrices.

Results for non stationary environments.

As underlined before, recognition experiments on homogeneous sessions are somewhat of a simplification of realistic environments. In real applications, the amount of noise may vary largely from sentence to sentence. By constraining the data to belong to one session, we help the algorithm to learn the combined speaker and environment effects. This may introduce a database bias in favor of MAP|MLLR, since for this data separating the effects is not really crucial. To deal with this problem we merged the 30 MPH and the 60 MPH data, by interleaving sentences. The interleaving lengths were chosen to be a powers of two, $I=2^K$ with $k=0 \ldots 6$. We also have increased the lexicon size to 4200 words, since words pronounced during the two sessions are different. This makes absolute recognition rates difficult to compare with previous results. Table 4 shows recognition results averaged across interleaving lengths. Notice that MAP|MLLR|JAC delivers 52% relative error rate reduction compared with MAP|MLLR, 19% compared with CMA, and 21% compared with JAC.

| JAC  | CMA  | MAP\|MLLR | MAP\|MLLR\|JAC |
|------|------|-----------|----------------|
| 20.7 | 20.2 | 34.2      | 16.3           |

Table 4: Average word error rates for simulated non stationary environments.

Figure 2:
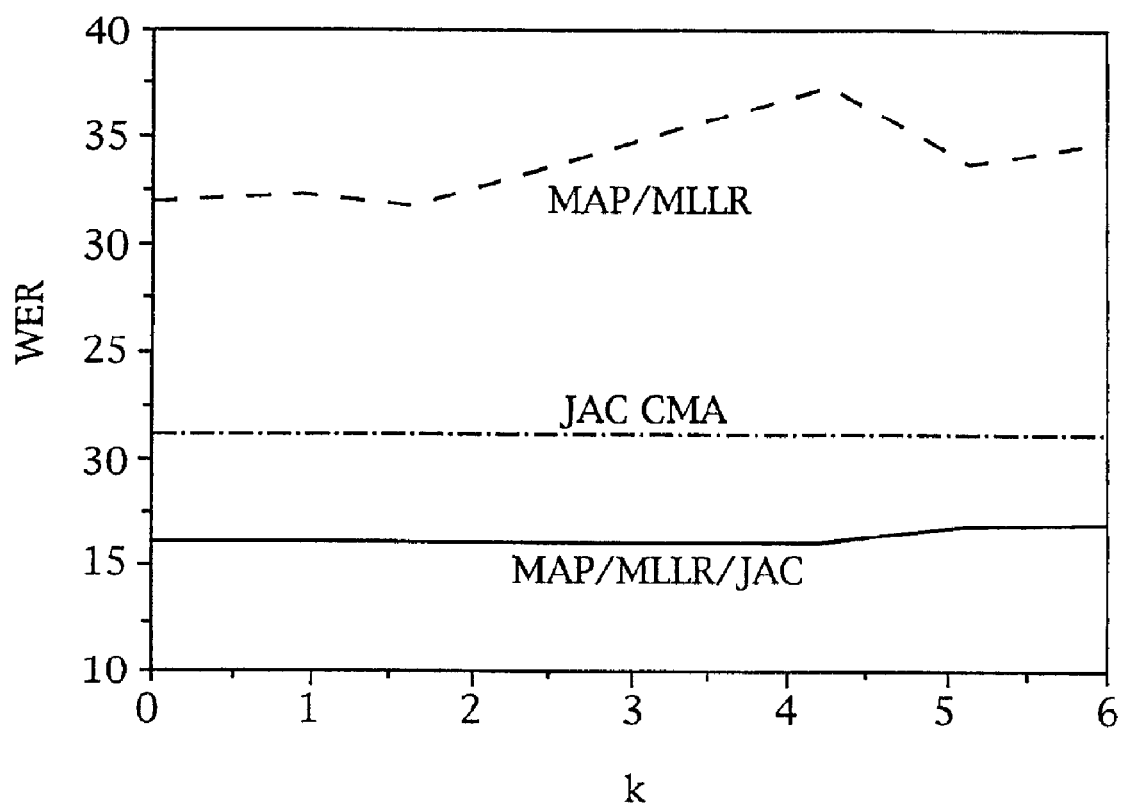
FIG. 2 is a graph showing the word error rates for speaker adaptation and for joint speaker adaptation and noise compensation with different interleaving lengths.

FIG. 2 shows recognition results given the interleaving length in a logarithmic scale. The interleaving length can be interpreted as a factor of non-stationary for simulated environment (a small k induces a less stationary environment). Obviously non-incremental methods like JAC or CMA are not affected by k, however incremental methods in principle may be influenced. Notice that MAP|MLLR is very sensitive to hand that word error rates increase significantly with k. We believe that for large k the speaker adaptation (that is modeling both speakers and environment) overfits to the stronger environment effects and loses speaker adaptive power. This undesirable behavior is not shown by MAP|MLLR|JAC that delivers a performance almost independent from k.

This confirms that speaker and environment effects have been correctly separated, and that those separation resulted in a more robust system and in enhanced capability to estimate persistent speaker dependent effects.

What is claimed is:

1. A method of performing speaker adaptation upon speech models associated with a speech recognizer, the speech models having been created under first environmental conditions, comprising:

obtaining input speech under second environmental conditions from a speaker for whom the speech models are to be adapted nd extracting observation data from said input speech;

decoding said observation data to ascertain state segmentation data associated with said observation data;

providing a linear approximation operator that embeds a priori knowledge of said first environmental conditions;

operating upon said observation data using said linear approximation operator and said state segmentation data to transform said observation data into compensated observation data that approximates the observation data under said first environmental conditions;

applying a speaker adaptation operating upon said compensated observation data to generate adapted speech models for said speaker.

2. The method of claim 1 wherein said observation data is extracted by performing feature extraction upon said input speech.

3. The method of claim 2, further comprising utilizing a special linear approximation of background noise that is applied after feature extraction and prior to speaker adaptation to allow the speaker adaptation t adapt speech models to an enrolling user without distortion from the background noise.

4. The method of claim 1 wherein said observation data is extracted by generating cepstral coefficients based on said input speech.

5. The method of claim 1 further comprising:

determining the difference between said first and second environmental conditions;

using said difference and said linear approximation operator to alter said speech models to at least approximately match said second environmental conditions; and using said altered speech models to perform said decoding step.

6. The method of claim 5 wherein said step of altering said speech models prior to decoding is performed by applying said linear approximation operator to said speech models; and wherein said operating step is performed by applying the inverse of said linear approximation operator to said observation data.

7. The method of claim 1 wherein aid operating step is performed by applying the inverse of said linear approximation operator to said observation data.

8. The method of claim 7 wherein the inverse linear approximation operator operates upon said observation data, using the state segmentation data, and a result of the inverse approximation is a set of modified observation data that has been cleaned up to remove effects of background noise, and speaker adaptation is then performed.

9. The method of claim 8, wherein the speaker independent acoustic models, once adapted, are used to extract even more accurate state segmentation, which is then used to perform an even more precise inverse linear approximation operation with further improved speaker adaptation.

10. The method of claim 1 wherein said adaptation operation is commutative with said linear approximation operator.

11. The method of claim 1 wherein said adaptation operation employs maximum a posteriori estimation.

12. The method of claim 1 wherein said adaptation operation employs maximum likelihood linear regression.

13. The method of claim 1 wherein said linear approximation operator employs a Jacobian matrix.

14. The method of claim 1 wherein said linear approximation operator employs a Jacobian matrix modified by a linear transformation.

15. A speaker adaptation system comprising:

a speech recognizer employing a first set of speech models created under first environmental conditions, said speech recognizer having an input through which a user provides input speech under second environmental conditions and having an output that supplies observation data corresponding to said second environmental conditions;

a speaker adaptation module coupled to said speech recognizer, said speaker adaptation module performing a speaker adaptation process upon said first set of speech models based on said observation data;

said speaker adaptation module further having linear approximation operator that stores knowledge of said first environmental conditions and adjusts said observation data to correspond to said first environmental conditions and thereby compensate for differences between said first and second environmental conditions.

16. The adaptation system of claim 15 wherein said speech recognizer employs a feature extraction component to develop said observation data.

17. The adaptation system of claim 15 wherein said recognizer employs a decoder for providing state segmentation information to said speaker adaptation module.

18. The adaptation system of claim 15 wherein said observation data are cepstral coefficients.

19. The adaptation system of claim 15 wherein said speech recognizer is a noise compensated recognizer.

20. The adaptation system of claim 15 wherein said speech recognizer employs a feature extraction component to develop a measure of the difference between said first and second environmental conditions.

21. The adaptation system of claim 20 further comprising a second linear approximation operator operable to adjust said first set of speech models based on said measure of the difference between said first and second environmental conditions.

22. The adaptation system of claim 15 wherein said adaptation module employs maximum a posteriori estimation.

23. The method of claim 15 wherein said adaptation module employs maximum likelihood linear regression.

24. The method of claim 15 wherein said linear approximation operator employs a Jacobian matrix.

25. The method of claim 15 wherein said linear approximation operator employs a Jacobian matrix modified by a linear transformation.

* * * * *

UNITED STATES PATENT AND TRADEMARK OFFICE
CERTIFICATE OF CORRECTION

PATENT NO. : 6,915,259 B2
DATED : July 5, 2005
INVENTOR(S) : Luca Rigazio et al.

It is certified that error appears in the above-identified patent and that said Letters Patent is hereby corrected as shown below:

Title page,
Item [75], Inventors, "David Kryze, Ponchartrain (FR)" should be -- David Kryze, Santa Barbara, CA --.
Item [56], References Cited, OTHER PUBLICATIONS,
"S. Sagayama, Y. Yamaguchi, S. Takahashi, J. Takahashi, "Jacobian Approach to Fast Acoustic Model Adaptation", Acoustics, Speech, and Signal Processing 1997, IEEE International Conference on Munich, Germany" should be
-- S. Sagayama, Y. Yamaguchi, S. Takahashi, J. Takahashi, "Jacobian Approach to Fast Acoustic Model Adaptation", Acoustics, Speech, and Signal Processing 1997, IEEE International Conference on Munich, Germany --.

Column 7,
Line 19, "nd" should be -- and --.
Line 40, "t" should be -- to --.
Line 61, "aid" should be -- said --.

Signed and Sealed this

Tenth Day of January, 2006

JON W. DUDAS
*Director of the United States Patent and Trademark Office*